United States Patent
Perry

[11] 4,172,885
[45] Oct. 30, 1979

[54] PROCESS FOR THE RECOVERY OF HYDROGEN FROM AMMONIA PURGE GASES

[75] Inventor: Eli Perry, Olivette, Mo.

[73] Assignee: Monsanto Company, St. Louis, Mo.

[21] Appl. No.: 888,101

[22] Filed: Mar. 20, 1978

[51] Int. Cl.$^2$ .............................................. C01C 1/04
[52] U.S. Cl. .......................................... 423/359; 55/16
[58] Field of Search ................ 423/359, 360, 361, 362, 423/363; 55/16, 158

[56] References Cited

U.S. PATENT DOCUMENTS

| | | | |
|---|---|---|---|
| 3,251,652 | 5/1966 | Pfefferle | 55/16 |
| 3,675,434 | 7/1972 | Crawford et al. | 62/23 |
| 3,947,551 | 3/1976 | Parrish | 423/359 |
| 4,055,627 | 10/1977 | Guadalupi | 423/359 |
| 4,058,589 | 11/1977 | Haslam | 423/359 |

FOREIGN PATENT DOCUMENTS 105429   6/1973  Fed. Rep. of Germany ........... 423/359

OTHER PUBLICATIONS

Brubaker et al., Separation of Gases by Plastic Membranes, I & EC, vol. 46, No. 4, pp. 731-739, 1954.
Baichtok et al., Membrane Tekhnol–Novoe Napravlenie Nauke Tekh, 1973.
Gardner et al., Hollow Fiber Permeator for Separating Gases, Chem. Eng. Prog., 10/77, pp. 76-78.

Primary Examiner—O. R. Vertiz
Assistant Examiner—Thomas W. Roy
Attorney, Agent, or Firm—Norman L. Balmer; Howard C. Stanley; James W. Williams, Jr.

[57] ABSTRACT

Ammonia synthesis processes are disclosed which provide enhanced conversion of hydrogen values to ammonia. In the processes, a purge stream from an ammonia synthesis loop is treated to reduce its ammmonia content to less than about 0.5 volume percent. The purge stream is then contacted at a pressure of at least substantially the superatmospheric synthesis pressure of the ammonia synthesis with the feed side of a separation membrane which exhibits selective permeation of hydrogen as compared to the permeation of each of methane and argon. A total pressure differential is maintained across the membrane to provide a driving force for hydrogen permeation through the membrane. A hydrogen-rich permeating gas is obtained on the permeate exit side of the membrane. The permeating gas is combined with gas passing to the ammonia synthesis reaction zone for conversion to ammonia. For instance, the permeating gas can be combined with synthesis feed gas or directly introduced into the ammonia synthesis loop. A non-permeating gas is removed from the feed side of the separation membrane at substantially the same pressure at which the purge stream is contacted with the separation membrane and provides a valuable source of energy due to its high pressure and combustible gas content.

26 Claims, 5 Drawing Figures

PROCESS FOR THE RECOVERY OF HYDROGEN FROM AMMONIA PURGE GASES

This invention relates to processes for synthesizing ammonia from nitrogen and hydrogen, and particularly to ammonia synthesis processes in which hydrogen is recovered from an ammonia synthesis loop purge stream and recycled for use in the ammonia synthesis reaction.

By this invention, there are provided processes for the synthesis of ammonia from nitrogen and hydrogen which processes are characterized by enhanced conversion of hydrogen to ammonia. In accordance with the processes of this invention, the enhanced hydrogen conversion can be achieved even when process equipment design limitations do not permit an increase in the amount of ammonia produced; however, often increased ammonia production can be obtained. The enhanced conversion of hydrogen which can be achieved by the processes of this invention involve little additional energy consumption over similar ammonia processes which do not have the enhanced hydrogen conversion, and frequently, the energy consumption per unit of ammonia product produced is decreased. Additionally, purge gases from the processes of this invention are at high pressure and provide a valuable source of energy. Moreover, the enhanced hydrogen conversion provided by the ammonia synthesis processes of this invention can be achieved without undue deleterious effects on the ammonia synthesis process equipment. Furthermore, existing ammonia synthesis plants can facilely be modified to utilize ammonia synthesis processes in accordance with this invention. Advantageously, if desired, the enhanced conversion of hydrogen to ammonia in these modified prior ammonia synthesis processes can be achieved with the use of conventional operating conditions of the ammonia synthesis reaction zone. Thus, operational changes due to the modification, if required at all, may be minor.

Ammonia is synthesized from the catalytic reaction of hydrogen and nitrogen. The hydrogen feedstock for the ammonia synthesis is generally obtained from primary reforming of hydrocarbon, e.g., natural gas. The effluent from the primary reforming thus contains impurities such as methane, carbon oxides, i.e., carbon dioxide and carbon monoxide, water and the like. Current practice provides for the removal of impurities from the reformer effluent which may be harmful to the ammonia synthesis catalyst such as the carbon oxides, sulfur compounds and the like; however, impurities such as methane are generally not completely removed from the reformer effluent since they are not directly harmful to the ammonia synthesis reaction and are expensive to remove. The nitrogen feedstock is usually obtained from air with the removal of oxygen, e.g., by combustion with fuel to produce water or carbon dioxide and water, followed by removal of the water and carbon dioxide, if present, or by liquifaction. The resultant nitrogen stream contains minor amounts of impurities such as argon which are present in minor amounts in air. Since these impurities are not directly harmful to the ammonia synthesis reaction, they are not generally removed from the nitrogen feedstock due to economic considerations.

The hydrogen feedstock and nitrogen feedstock are combined in essentially stoichiometric amounts to provide a synthesis feed gas for producing ammonia, and the synthesis feed gas is compressed to ammonia synthesis pressures, e.g., superatmospheric pressures of often at least about 100 atmospheres absolute. The compressed synthesis feed gas is contacted with an ammonia synthesis catalyst, such as a promoted iron catalyst, in an ammonia synthesis reaction zone. The ammonia synthesis reaction is exothermic and frequently temperatures greater than about 400° C. are produced. Generally, the conversion to ammonia based on hydrogen fed to the synthesis reaction zone is less than about 30 percent, and frequently less than about 20 percent. Thus the reaction effluent from the ammonia synthesis reaction zone contains substantial amounts of hydrogen and nitrogen. Accordingly, ammonia is condensed from the reaction effluent and the reaction effluent containing the valuable hydrogen is recycled in an ammonia synthesis loop to the ammonia synthesis reaction zone in order to provide an attractive conversion of hydrogen in the synthesis feed gas to ammonia. Difficulties occur in that the impurities such as methane, argon, etc., in the hydrogen and nitrogen feedstocks do not take part in the ammonia synthesis reaction and must be removed from gas in the ammonia synthesis loop in an amount sufficient to prevent an undue build-up of these inert components in the ammonia synthesis loop. Conveniently, the removal of these inert components is effected by removing a purge stream from the ammonia synthesis loop. The purge stream will contain the same concentration of hydrogen and nitrogen as the gas in the ammonia synthesis loop. Hence, recovery of the valuable hydrogen from the purge stream for return to the ammonia synthesis reaction zone may be highly desirable.

Ammonia synthesis processes which are of commercial interest are complex with the steps in the processes being highly interrelated to maximize ammonia production on an economically attractive basis. Thus changes in one step of the process may affect other steps in the process as well as the overall economics, including capital expenditures and operating expenditures, of an ammonia synthesis plant. Therefore, the adoption of a procedure for recovering and recycling hydrogen from the purge stream to the ammonia synthesis reaction zone may be detrimental to the overall economics or process steps of the ammonia synthesis even though hydrogen is recovered and recycled.

Proposals for recovery of hydrogen from ammonia synthesis purge streams have included proposals for cryogenic recovery systems. More recent proposals for cryogenic hydrogen recovery systems for treating purge streams have emphasized reducing operating costs especially with respect to energy consumption in cooling and the selective removal of helium from hydrogen using cryogenic processes. For instance, Haslam in U.S. Pat. No. 4,058,589, issued Nov. 15, 1977, (see also Haslam, et al, "Recycle $H_2$ in $NH_3$ Purge Gas", *Hydrocarbon Processing*, January 1976, pp. 103–106) discloses a process for the treatment of ammonia synthesis purge containing helium. In the disclosed process, the purge stream is cooled to about 85° K. at 735 psig (about 51 atmospheres absolute) to condense methane, nitrogen, argon, and some helium, and provide a hydrogen-rich gas stream. The hydrogen-rich stream is used in heat exchange to the purge stream to be treated while being maintained at 735 psig. The hydrogen-rich stream is then recycled and combined with the fresh hydrogen and nitrogen feedstock to the ammonia synthesis reaction zone. Crawford, et al, in U.S. Pat. No. 3,675,434, issued July 11, 1972, disclose another cryogenic process for treating ammonia synthesis purge to recover a hydrogen-rich gas. In the process disclosed by Crawford, et al, the purge gas is cooled to provide a condensate and a higher pressure hydrogen-rich gas. The condensate is flashed to produce a lower pressure hydrogen-rich gas and a condensate containing nitrogen, methane and argon. Both of the higher and lower pressure hydrogen-rich gases are used in heat exchange to reduce temperatures of the purge stream. The higher pressure hydrogen-rich gas is returned to the ammonia synthesis reaction zone by means of a compressor in the ammonia synthesis loop, and the lower pressure hydrogen-rich gas is returned to the feed compressor to be compressed with the hydrogen and nitrogen feedstocks. Generally, the purge stream from cryogenic hydrogen recovery systems is low pressure and hence its energy content has been significantly depleted. Although cryogenic recovery of hydrogen from ammonia synthesis purge streams has long been suggested, its adoption has been limited due to the high capital costs of cryogenic recovery systems and limited savings which could be appreciated in using the systems.

Increasing costs and shortages of natural resources required for ammonia synthesis such as natural gas are leading to greater interest in developing alternative methods for recovering valuable hydrogen from ammonia synthesis purge gases wich alternative methods do not require unduly high capital costs or operating expenses. One method which has achieved limited interest is the use of separation membranes which exhibit selective permeation.

Gardner, et al, in "Hollow Fiber Permeator for Separating Gases", *Chemical Engineering Progress,* October 1977, pages 76 to 78, suggest that one application for separation membranes is in treating an ammonia synthesis purge stream to recover hydrogen. This article reports the substance of a paper presented at the meeting of the American Institute of Chemical Engineers on about Mar. 21, 1977. The authors suggest several benefits which might be achieved through hydrogen recovery using separation membranes; however, the simplified flow diagrams and descriptions which are presented essentially provide only that membranes might be useful in an ammonia synthesis system without any of the specifics which are necessary in order to provide an operable, efficient ammonia synthesis system. Specifically, Gardner, et al, disclose an ammonia synthesis system in which the purge stream is reduced in total pressure from about 1900 pounds per square inch gauge (psig) (about 130 atmospheres absolute) to about 1000 psig (about 69 atmospheres absolute) and passed through the bores of 7 hollow fiber-containing permeators. A further 100 psig (6.8 atmospheres) pressure loss in the purge stream is incurred by passage through the bores of the hollow fibers. A hydrogen-rich permeate is obtained from the shell side of the permeators at a pressure of 400 psig (about 28 atmospheres absolute), and the permeate is combined with the feed at 400 psig (about 28 atmospheres absolute) and recompressed to the ammonia synthesis pressure. Accordingly, even though only a 34 to 40 atmosphere pressure differential occurs across the membrane, the expense of recompressing the permeate to over 130 atmospheres absolute must be borne.

Many factors are involved in providing an operable, efficient ammonia synthesis process in which separation membranes are employed to recover hydrogen from the purge stream, for instance, the nature and relative concentrations of the components in the purge stream contacting the membrane, the pressure drop of the permeating and non-permeating gases from the membrane, the conditions of the process stream in which the recovered hydrogen is reintroduced into the ammonia synthesis system, the nature of the gases with which the hydrogen-rich gases are combined and the like.

In view of the many factors involved in providing an operable, efficient ammonia synthesis process in which hydrogen is recovered from the purge stream by separation membranes, it is not surprising that there has been little, if any, interest in the use of membranes to recover hydrogen from purge streams. Since the cryogenic hydrogen recovery systems separate gases by a different mechanism than that of separation membranes, it is not unexpected that substantial differences exist in the nature of the hydrogen-rich gas obtained by each method. These differences may be not only in components and compositions but also in pressures, temperatures and the like. Accordingly, it is easily appreciated that technology pertaining to cryogenic recovery of hydrogen in ammonia purge streams may not be applicable to the use of separation membranes for recovery of hydrogen from ammonia purge streams.

In accordance with the processes of this invention for synthesizing ammonia, a nitrogen and hydrogen-containing reactor feed gas is introduced to and reacted in an ammonia synthesis reaction zone at superatmospheric synthesis pressures to produce ammonia. An ammonia-containing gas, i.e., the reaction effluent, is withdrawn from the ammonia synthesis reaction zone. The reaction effluent contains substantial amounts of unreacted nitrogen and hydrogen and is recycled in an ammonia synthesis loop to the ammonia synthesis reaction zone. A synthesis feed gas comprising nitrogen, hydrogen and contaminants including at least one of methane and argon is compressed to the superatmospheric synthesis pressure and is combined with the recycling reaction effluent in the ammonia synthesis loop. Ammonia product is removed from the reaction effluent in the ammonia synthesis loop. Also, a purge stream is removed from the reaction in the synthesis loop in an amount sufficient to maintain the volume percent of inerts, e.g., methane and argon, in the reactor feed gas suitably low. The purge stream is at substantially the superatmospheric synthesis pressure.

In the processes of this invention, a purge stream from the ammonia synthesis loop is treated to reduce its ammonia concentration to less than about 0.5, preferably, less than about 0.1, volume percent. The purge stream is then contacted at a pressure of at least substantially the superatmospheric synthesis pressure with a separation membrane. The separation membrane exhibits selective permeation of hydrogen as compared to the permeation of each of methane and argon. The separation membrane also exhibits permeability to ammonia. A total pressure differential across the membrane is maintained to provide the driving force for hydrogen permeation through the membrane. Frequently, the pressure of the purge gas contacting the separation membrane is greater than about 20, preferably, 10, atmospheres below the superatmospheric synthesis pressure. High total pressure differentials across the membrane are enabled since the purge stream is contacted with the membrane at such a high pressure. The high pressure differentials across the membrane which can be achieved in accordance with the processes of this invention can provide advantageous driving forces for the permeation of hydrogen through the membrane without requiring undue recompression of the permeating gas for its reintroduction into the ammonia synthesis reaction zone. Undue recompression of the permeating gas can significantly offset the savings which are obtained by recovering the hydrogen in the purge stream. Moreover, due to the capability of employing high total pressure differentials across the membrane, good hydrogen flux through the membrane can be provided such that at least about 20 percent of the hydrogen in the purge stream permeates through the membrane.

The permeating gas is recovered from the exit side of the membrane and is recycled to the ammonia synthesis reaction zone by its combination with a gas passing to the ammonia synthesis reaction zone. Since the ammonia concentration in the purge stream has been reduced to less than about 0.5, preferably less than 0.1, volume percent prior to the contact of the purge stream with the membrane, the permeating gas will contain, at most, little amounts of ammonia. Accordingly, the process of the invention provides significant flexibility in the manner in which the recovered hydrogen is recycled to the ammonia synthesis system. For instance, the permeating gas can be combined with moisture-containing feed stream to the ammonia synthesis reaction zone without undue problems, e.g., corrosion, which can occur in the presence of gases containing water vapor and ammonia. The permeating gas can be recycled to the ammonia synthesis reaction zone by combining the permeating gas with the synthesis feed gas or by recompressing the permeating gas to substantially the superatmospheric synthesis pressure for introduction into the ammonia synthesis loop. The non-permeating gas is removed from the feed side of the separation membrane at substantially the same pressure at which the purge stream is contacted with the separation membrane and thus provides a valuable energy source.

In further detail, the predominant components of the synthesis feed gas are hydrogen and nitrogen. The synthesis feed gas contains at least one of methane and argon as contaminants. Methane may be present in amounts of up to about 5, e.g., about 0.1 to 3, volume percent, and argon may be present in amounts up to about 0.5, e.g., about 0.1 to 0.5, most often about 0.3, volume percent. Other contaminants which may be present include water and helium. The ratio of hydrogen to nitrogen which is present in the feed gas is preferably such that the mole ratio of hydrogen to nitrogen of the reaction gas introduced into the ammonia synthesis reaction zone is substantially constant to prevent a build-up of either hydrogen or nitrogen in the ammonia synthesis loop. However, the mole ratio of hydrogen to nitrogen in the reactor feed gas may be greater or less than the stoichiometric ratio such that the excess of hydrogen or nitrogen over that required for the reaction to ammonia on a stoichiometric basis shifts the equilibrium in favor of ammonia production. In such situations, the mole ratio of hydrogen to nitrogen may be from about 2 or 2.5:1 to about 3.5 or 4:1. Higher or lower mole ratios could be employed; however, since a purge stream must be removed from the synthesis loop to prevent undue build-up of contaminants, considerable increases in the amount of nitrogen or hydrogen in the purge stream would occur. Since the processes of this invention minimize the loss of hydrogen in the purge stream, ammonia synthesis processes in which the reactor feed gas has a greater than 3:1 mole ratio of hydrogen to nitrogen, may become attractive. Generally, the mole ratio of hydrogen to nitrogen in the reactor feed gas is about 2.8:1 to 3.5:1, say, about 2.9:1 to 3.3:1. Frequently, the mole ratio of hydrogen to nitrogen in the reactor feed gas is substantialy that mole ratio required for the reaction of hydrogen and nitrogen on a stoichiometric basis, e.g., about 2.95:1 to 3.05:1. Generally, nitrogen does not permeate the membrane to a significant extent, and the permeating gas contains little, if any, nitrogen. However, any nitrogen which is recovered by and recycled from the separation membrane represents a savings with respect to the nitrogen feedstock demands. The mole ratio of hydrogen to nitrogen in the synthesis feed gas generally is slightly less than the mole ratio of hydrogen to nitrogen in the reactor feed gas since additional hydrogen is provided by the permeating gas from the separation membrane. In typical ammonia plants in accordance with this invention, the mole ratio of hydrogen to nitrogen in the synthesis feed gas may be about 2.7:1 to 3.2:1, say, about 2.8:1 to 3.0:1. Frequently, the reactor feed gas fed contains about 0.5 to 5, say, about 1 to 4, volume percent ammonia in less than about 25 volume percent inert contaminants, say, about 4 to 15 volume percent inert contaminants. Thus, the reactor feed gas may comprise about 2 to 15 volume percent methane, about 2 to 10 volume percent argon, and helium if present in the reformer feed, e.g., in an amount of about 0.1 to 5 volume percent.

The reaction between hydrogen and nitrogen to produce ammonia is exothermic and is an equilibrium reaction. The ammonia synthesis may be conducted using any suitable procedure such as the Haber-Bosch, modified Haber-Bosch, Fauser and Mont Cenis systems. See, the *Encyclopedia of Chemical Technology*, Second Edition, Volume 2, pages 258, et seq., herein incorporated by reference, for processes for synthesizing ammonia from hydrogen and nitrogen. In general, these processes employ superatmospheric ammonia synthesis pressures of at least about 100 atmospheres absolute and promoted iron synthesis catalysts. The ammonia synthesis reaction zone is generally cooled to maintain reaction temperatures of about 150° or 200° to 600° C. The use of high synthesis pressures shifts the equilibrium in favor of the formation of ammonia. Although some ammonia synthesis pressures which have been employed are as high as 500 or more atmospheres absolute, most present day ammonia plants utilize synthesis pressures of about 100 to 300 or 350 atmospheres absolute, especially about 125 to 275 atmospheres absolute. Typically, the ammonia synthesis feed gas is compressed in at least two stages in order to facilitate achieving synthesis pressures. Generally, the pressure of the synthesis feed gas prior to at least one compression stage is within at least about 100, say, within about 20 to 100, atmospheres below the synthesis pressure. The lowest pressure in the ammonia synthesis loop is preferably within about 5 or 10 atmospheres below the synthesis pressure. A recycle compressor is generally employed to circulate the gases in the synthesis loop and maintain the synthesis pressure in the ammonia synthesis reaction zone.

The conversion to ammonia based on hydrogen entering the ammonia synthesis reaction zone is often about 5 to 30, e.g., about 8 to 20 percent. In many commercial plants, the ammonia concentration of the reaction effluent exiting the ammonia synthesis reaction zone is about 10 to 15 or 25, volume percent.

Ammonia in the reaction effluent from the ammonia synthesis reaction zone is removed from the synthesis loop. A preferred method for removing the ammonia is by chilling the ammonia-containing reaction effluent to condense and coalesce ammonia which can be removed as a liquid product. After removal of the ammonia the gases still may contain ammonia, e.g., up to about 5 volume percent ammonia. The coalescing of ammonia from the gas in the ammonia synthesis loop is preferably conducted subsequent to the recycle compression. Two or more ammonia coalescers may be employed in the synthesis loop to enhance ammonia recovery.

The compressed synthesis feed gas may be introduced into the ammonia synthesis loop at any suitable location, e.g., before or after the recycle compression, and before or after the ammonia removal. In many instances, however, it is preferred to introduce the compressed synthesis feed gas into the ammonia synthesis loop prior to coalescing ammonia since the coalescing can remove water vapor and thus insure that the reactor feed gas has a low oxygen compound content to prevent catalyst poisoning.

The purge stream is removed from the ammonia synthesis loop in order to maintain desirably low concentrations of inert contaminants in the reactor feed gas. The purge stream often comprises up to about 3, say, 0.5 to 2.5, most frequently about 0.5 to 2, volume percent of the gases in the synthesis loop at the point at which the purge is taken. In view of the recovery of hydrogen from the purge stream in accordance with the processes of this invention, purge rates higher than those conventionally employed in ammonia synthesis processes may be attractive. It is generally preferred to remove the purge stream from the ammonia synthesis loop upstream of the introduction of the compressed synthesis feed gas to prevent purging of the fresh hydrogen and nitrogen feed. The purge stream may be removed from the synthesis loop upstream of the ammonia removal. In this case, the purge stream contains significant quantities of ammonia, and preferably at least a major portion of the ammonia in the purge stream, is recovered as ammonia product, e.g., liquid ammonia. Alternatively, the purge stream may be removed from the synthesis loop downstream of the ammonia removal, e.g., the ammonia coalescer, from the synthesis loop. Usually the gas in the ammonia synthesis loop downstream from the ammonia coalescer also contains significant amounts of ammonia. Therefore, regardless of where the purge stream is taken from the synthesis loop, ammonia is required to be removed prior to contacting the purge stream with the separation membrane. The ammonia concentration of the purge stream prior to contacting the separation membrane is reduced to less than about 0.5, preferably less than 0.1, volume percent and is often less than about 500, say, about 10 to 500, parts per million by volume (ppmv). At these concentrations of ammonia, additional recovery of ammonia from the purge stream is usually not economically feasible, and the ammonia concentration may be sufficiently low that the purge stream can be vented to the environment or used as fuel.

The removal of the ammonia from the purge stream may be by any suitable means, e.g., by at least one of chilling to coalesce ammonia, and adsorption or absorption of ammonia. Frequently, if the ammonia removal from the purge stream is only by chilling, at the pressure of the purge stream, the purge stream must be chilled to below about −30° C. to enable sufficient ammonia to be removed. Preferably, ammonia is removed from the purge stream by chilling to condense and coalesce ammonia which is removed as liquid product, and then subjecting the purge stream to scrubbing, e.g., with water, to remove additional ammonia. The scrubber, e.g., using water at a temperature of about 10° to 50° C. or more, removes ammonia in the form of ammonium hydroxide, and ammonia can be regenerated, if desired, from the spent scrubber liquor by heating. Alternatively, the ammonia may be removed from the purge stream using only a scrubber. Generally, this procedure is less desirable since all of the ammonia removed from the purge stream is in the form of ammonium hydroxide. If a water scrubber is employed to remove ammonia from the purge stream, the purge stream will contain moisture and tends to become saturated with water vapor. Since water vapor can permeate through many separation membranes, sufficient water should be removed from the hydrogen-rich permeating gas to provide acceptable, low moisture levels in the reactor feed gas to prevent undue deactivation of the synthesis catalyst.

The purge stream may, if necessary, be subjected to indirect heat exchange to provide suitable temperatures for effecting hydrogen separation by the use of separation membranes. Often, the purge stream to be contacted with the separation membrane is at least about 10° C., say, about 15° to 50° C. Higher temperatures may be employed depending upon the physical stability and the selectivity of separation of the membrane at the higher temperatures.

The purge stream is contacted with a separation membrane which exhibits selectivity to the permeation of hydrogen as compared to the permeation of each of methane and argon. In view of the generally substantially lower volume concentration of methane and argon in the purge stream as compared to the volume concentration of hydrogen in the purge stream, suitable separation membranes need not exhibit high selectivity of separation of hydrogen from each of methane and argon in order to provide an enhanced ammonia synthesis process. Generally, the selectivity of separation of a membrane is described in terms of the ratio of the permeability of the fast permeating gas (hydrogen) to the permeability of the slow permeating gas (methane or argon) wherein the permeability of the gas through the membrane can be defined as the volume of gas, standard temperature and pressure (STP), which passes through a membrane per square centimeter of surface area, per second, for a partial pressure drop of 1 centimeter of mercury across the thickness of the membrane. This ratio is referred to as a separation factor for the membrane. For the sake of uniformity, the permeabilites and separation factors mentioned herein are determined at about 25° C. and a pressure drop of about 3.4 atmospheres across the membrane with the feed side of the membrane being about 3.4 atmospheres absolute unless otherwise indicated. Often, the separation factor of the membrane for the permeation of hydrogen over methane is at least about 10. Separation factors for hydrogen over methane of 100 or greater may be provided by certain membranes. However, in many instances little advantage may be obtained using such highly selective membranes. Often, the membrane is selected on its ability to quickly permeate hydrogen rather than on its selectivity of separation. Consequently, membranes exhibiting a separation factor for hydrogen over methane of about 10 to 50 to 80 are acceptable providing the membrane exhibits a high permeability to hydrogen. Clearly, the higher the permeability of hydrogen through a membrane, the less available membrane surface area which is required for a desired hydrogen flux through the membrane. Particularly desirable membranes exhibit hydrogen permeabilities of at least about $1\times10^{-6}$, preferably at least about $20\times10^{-6}$, cubic centimeters of hydrogen (STP) per square centimeter of membrane surface area per second at a partial pressure drop of 1 centimeter of mercury across the thickness of the membrane.

The effective membrane surface area (i.e., the membrane area available to effect separation) should be sufficient to provide a desired hydrogen flux. Factors influencing the determination of the amount of effective membrane surface area include the permeability of hydrogen through the membrane under the separation conditions, i.e., temperature, absolute pressure, total pressure differential across the membrane, the partial pressure differential of hydrogen across the membrane. According to current theory, the rate at which a moiety permeates through a separation membrane is dependent in part on the driving force for that moiety. With respect to membrane separations in which the moiety is gaseous and passes from a feed gas mixture to a permeating gas on the exit side of the membrane, the driving force is the differential in fugacity for that moiety. Generally, fugacities for ideal gases are approximated by partial pressures and thus conventionally in gas separations, the driving force is referred to in terms of partial pressure differentials. The partial pressure of a moiety in a gas mixture can be defined as the concentration of the moiety in the gas mixture on a molecular basis times the total pressure of the gas mixture. Often, the concentration of the moiety on a molecular basis is approximated by the volume concentration of the moiety. In view of the effect of the concentration of the moiety in the gas and the total pressure of the gas on the partial pressure, these parameters can be varied jointly or separately to provide suitable partial pressure differentials across the membrane to provide desirable rates of permeation of the moiety. Advantageous total pressure differentials across the membrane which provide suitable driving forces for the permeation of hydrogen are at least about 20 atmospheres. However, the total pressure differential should not be so great as to unduly stress the membranes such that it ruptures or is prone to easily rupturing. In many instances, the pressure differential across the membrane is about 50 to 120, say, about 50 to 90 or 100 atmospheres. Desirably, sufficient effective membrane area and total pressure differential is provided that at least about 20 percent, say, about 40 to 90, preferably about 40 to 80, percent of the hydrogen in the purge stream permeates the separation membrane.

The volume ratio of the permeating to non-permeating gases from the separation membrane as well as the composition of each of the permeating and non-permeating gases which may be employed in accordance with the method of this invention can be varied over a wide range. By way of illustration, Table I provides typical approximate concentrations of the significant components in the gases to be contacted with a separation membrane and those in the permeating and non-permeating gases. Ammonia may be present in all of these gases in, at most, small amounts, and the gases may contain small amounts of water vapor if the purge stream is water scrubbed to remove ammonia.

A permeator containing the separation membrane may be of any suitable design for gas separations, e.g., plate and frame, or having spiral wound film membranes, tubular membranes, hollow fiber membranes, or the like. Preferably, the permeator comprises hollow fiber membranes due to the high membrane surface area of membrane per unit volume of permeator which can be obtained.

TABLE I

| | Volume Percent of Stream | | | | | |
|---|---|---|---|---|---|---|
| | To Membrane | | Permeating Gas | | Non-Permeating Gas | |
| Component | General | Preferred | General | Preferred | General | Preferred |
| Hydrogen | 50-70 | 57-69 | 60 - Essentialy 100 | 80-98 | 20-60 | 20-50 |
| Nitrogen | 13-24 | 19-23 | Trace - 15 | Trace - 13 | 20-50 | 30-50 |
| Argon | 2-6 | 3-5 | Trace - 5 | Trace - 2 | 2-12 | 4-12 |
| Methane | 4-20 | 6-15 | Trace - 5 | Trace - 2 | 5-30 | 12-30 |
| Helium | 0-15 | 0-5 | 0-10 | 0-3 | 0-5 | 0-2 |

When the membranes are in tubular or hollow fiber form, a plurality of the membranes can be substantially parallelly arranged in bundle form and the purge stream can be contacted with either the outside (shell side) or the inside (bore side) of the membranes. Preferably, the purge stream is contacted with the shell side of the membranes since passage of the purge stream through the bore side of the membranes may involve substantially greater pressure losses. With shell side feed, the shell side effluent from the permeator can often be at a pressure within less than about 1 to 5, often within less than about 0.5, atmospheres below the pressure of the purge stream fed to the permeator. Since the concentration of hydrogen on the feed side of the membrane is continually diminishing as the hydrogen permeates to the permeate exit side of the membrane which has increasing concentration of hydrogen, the hydrogen partial pressure differential across the membrane is continually changing. Therefore, flow patterns in the permeator can be utilized to provide desirable recoveries of hydrogen from the purge stream. For instance, the flows of the purge stream and the permeating gas can be concurrent or countercurrent. With bundles of hollow fiber and tubular membranes, the shell side feed can be radial, i.e., the feed stream transversely flows past the membranes either to the inside or, usually, the outside of the bundle, or the flow can be axial, i.e., the feed stream disperses within the bundle and generally flows in the direction in which the hollow fibers or tubular membranes are oriented.

Any suitable material may be employed for the separation membrane. Moreover, since the purge stream contains little ammonia, the selection of membranes may be expanded to include those materials which may be adversely affected by gaseous ammonia. Typical membrane materials include organic polymers or organic polymer mixed with inorganics, e.g., fillers, reinforcements, and the like. Metallic and metal-containing membranes may also be employed. Polymers which may be suitable for the separation membranes can be substituted or unsubstituted polymers, especially carbon based polymers having carbon-carbon or carbon-oxygen backbones, and may be selected from polysulfones; poly(styrenes), including styrene-containing copolymers such as acrylonitrile-styrene copolymers, styrene-butadiene copolymers and styrenevinylbenzylhalide copolymers; polycarbonates; cellulosic polymers, such as cellulose acetate-butyrate, cellulose propionate, ethyl cellulose, methyl cellulose, nitrocellulose, etc.; polyamides and polyimides, including aryl polyamides and aryl polyimides; polyethers; poly(arylene oxides) such as poly(phenylene oxide) and poly(xylylene oxide); poly(esteramide-diisocyanate); polyurethanes; polyesters (including polyarylates), such as poly(ethylene terephthalate), poly(alkyl methacrylates), poly(alkyl acrylates), poly(phenylene terephthalate), etc.; polysulfides; polymers from monomers having alpha-olefinic unsaturation other than mentioned above such as poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amines), poly(vinyl phosphates), and poly(vinyl sulfates); and poly(vinyl acetal); polyallyls; poly(benzobenzimidazole); polyhydrazides; polyoxadiazoles, polytriazoles; poly(benzimidazole); polycarbodiimides; polyphosphazines; etc., and interpolymers, including block interpolymers containing repeating units from the above such as terpolymers of acrylonitrile-vinyl bromide-sodium salt of para-sulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups and the like.

Since the flux through a membrane is affected by the thickness of the membrane material through which a permeating moiety must pass, the membrane material is preferably as thin as possible yet sufficiently thick to provide adequate strength to the membrane to withstand membrane separation conditions. The membrane may be isotropic, i.e., has substantially the same density throughout, or may be anisotropic, i.e., has at least one zone of greater density than at least one other zone of the membrane. The membrane may be chemically homogeneous, i.e., constructed of the same material, or may be a composite membrane. Suitable composite membranes may comprise a thin layer which effects the separation on a porous physical support which provides the necessary strength to the membrane to withstand membrane separation conditions. Other suitable composite membranes are the multicomponent membranes disclosed by Henis, et al, in U.S. patent application Ser. No. 832,481, filed Sept. 13, 1977, herein incorporated by reference. These membranes comprise a porous separation membrane which substantially effects the separation and a coating material in occluding contact with the porous separation membrane. These multicomponent membranes are particularly attractive for gas separations in that good selectivity of separation and high flux through the membrane can be obtained.

The materials for the coating of the multicomponent membranes such as disclosed by Henis, et al, may be natural or synthetic substances, and are often polymers, and advantageously exhibit the appropriate properties to provide occluding contact with the porous separation membrane. Synthetic substances include both addition and condensation polymers. Typical of the useful materials, which can comprise the coating, are polymers which can be substituted or unsubstituted, and which are solid or liquid under gas separation conditions, and include synthetic rubbers; natural rubbers; relatively high molecular weight and/or high boiling liquids; organic prepolymers; poly(siloxanes) (silicone polymers); polysilazanes; polyurethanes; poly(epichlorhydrin); polyamines; polyimines; polyamides; acrylonitrile-containing copolymers such as poly($\alpha$-chloroacrylonitrile) copolymers; polyesters (including polylactams and polyarylates), e.g., poly(alkyl acrylates) and poly(alkyl methacrylates) wherein the alkyl groups have, say, 1 to about 8 carbons, polysebacates, polysuccinates, and alkyd resins; terpinoid resins; linseed oil; cellulosic polymers; polysulfones, especially aliphatic-containing polysulfones; poly(alkylene glycols) such as poly(ethylene glycol), poly(propylene glycol), etc.; poly(alkylene) polysulfonates; polypyrrolidones; polymers from monomers having $\alpha$-olefinic unsaturation such as poly(olefins), e.g., poly(ethylene), poly (propylene), poly(butadiene), poly(2,3-dichlorobutadiene), poly(isoprene), poly(chloroprene), poly(styrene) including poly(styrene) copolymers, e.g., styrene-butadiene copolymer, polyvinyls such as poly(vinyl alcohols), poly(vinyl aldehydes) (e.g., poly(vinyl formal) and poly(vinyl butyral)), poly(vinyl ketones) (e.g., poly (methylvinylketone)), poly(vinyl esters) (e.g., poly (vinyl benzoate)), poly(vinyl halides) (e.g., poly(vinyl bromide)), poly(vinylidene halides), poly(vinylidene carbonate), poly(N-vinylmaleimide), etc., poly(1,5-cyclooctadiene), poly(methylisopropenylketone), fluorinated ethylene copolymer; poly(arylene oxides), e.g., poly (xylylene oxide) and brominated poly(xylylene oxide); polycarbonates; polyphosphates, e.g., poly(ethylene-methylphosphate); and the like, and any interpolymers including block interpolymers containing repeating units from the above, and grafts and blends containing any of the foregoing. The polymers may or may not be polymerized after application to the porous separation membrane.

The non-permeating gas may be utilized in any suitable manner, e.g., used as fuel. Since the non-permeating gas is at high pressure, energy can be recovered from this gas. Advantageously, the non-permeating gas contains very small amounts of ammonia, and thus often additional quantities of ammonia need not be removed from the non-permeating gas before the non-permeating gas exits the ammonia synthesis system.

The permeating gas contains valuable hydrogen and is recycled such that the hydrogen can be utilized in the ammonia synthesis. In accordance with the method of this invention the pressure under which the permeating gas exits the separator is taken advantage of by returning the permeating gas to a gas stream which is substantially the same pressure as the permeating gas wherein the gas stream is passed to the ammonia synthesis reaction zone, or by recompressing the permeating gas for introduction into the ammonia synthesis loop. Thus recompression costs are minimized. Since the permeating gas contains little ammonia a high degree of flexibility is provided in selecting the stream in the ammonia synthesis process into which the permeating gas is to be introduced. For instance, the permeating gases can be introduced into water-containing streams without undue problems, e.g., corrosion problems, caused by the presence of both ammonia and water. The stream into which the permeating gas is introduced can be selected partially on the basis of the operating total pressure differentials across the separation membrane which can be employed, and particularly attractive gas streams to be combined with the permeating gas are synthesis feed gas streams. Since the compression of the synthesis feed gas is usually conducted in several stages, or steps, some limitation exists as to the pressure differentials across the membrane which are available in a given ammonia synthesis system, especially in ammonia synthesis systems which are retrofitted with separation membrane hydrogen recovery systems to enable conducting the ammonia synthesis process of this invention. In general, the total pressure differential across the separation membrane for a given ammonia synthesis system in accordance with this invention is selected to provide the largest operating total pressure differential across the separation membrane (within the range of suitable operating total pressure differentials for a given separation membrane) which provides a permeating gas at a suitable pressure for introduction into a synthesis feed gas stream or other suitable gas stream. Usually, the permeating gas is at a slightly higher pressure than the gas stream into which it is introduced, e.g., about 0.1 to 5 atmospheres higher. Any purposeful reduction in the pressure of the permeating gas should only be employed when no suitable gas stream is available which is at a pressure which permits a suitable total pressure differential across the membrane to be achieved, e.g., the available synthesis feed gas streams are at pressures too high to permit a desired hydrogen flux through the separation membrane or at pressures so low that the separation membrane can not physically withstand the pressure differential. In any event, any such purposeful reduction in pressure is less than about 20, preferably less than about 10, atmospheres absolute and may be made in the purge stream prior to contacting the separation membrane or in the permeating gas. Alternatively, a desirable pressure drop may be provided across the separation membrane and the permeating gas compressed to suitable pressures for introduction into a synthesis feed gas stream or synthesis loop, or, preferably, the purge stream may be compressed, e.g., up to about 100, say, about 10 to 100, atmospheres above the superatmospheric synthesis pressure, to provide a desired total pressure differential across the separation membrane and a permeating gas at a total pressure slightly above the gas stream into which it is to be introduced.

The invention will be further described with reference to the drawings in which:

In FIGS. 1 to 4, like reference numerals indicate like features.

Figure 1:
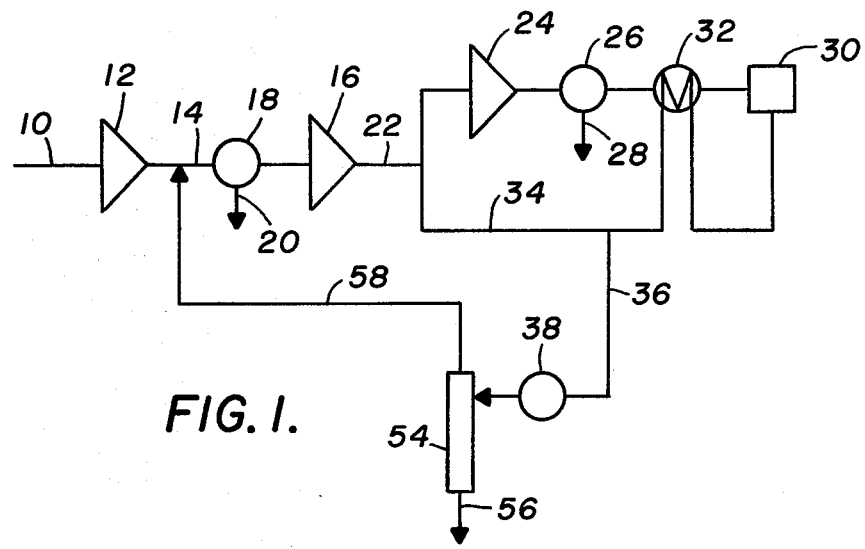
FIG. 1 is a simplified schematic flow diagram of an ammonia synthesis plant in accordance with this invention in which plant the permeating gas from the permeator is introduced into the synthesis feed gas between compression stages which compress the synthesis feed gas to superatmospheric synthesis pressures.

With reference to FIG. 1, a feed mixture of hydrogen and nitrogen in approximately a 3:1 molar ratio is introduced via line 10 into the ammonia synthesis sytem. The synthesis feed gas is compressed in several stages to superatmospheric ammonia synthesis pressures. As depicted, compressor 12 partially elevates the pressure of the synthesis feed gas toward the superatmospheric synthesis pressure. The partially compressed synthesis feed gas is then passed through conduit 14 to compressor 16 where it is compressed to substantially, i.e., within about 5 or 10 atmospheres, the superatmospheric synthesis pressure. It is to be realized that one or both of compressors 12 and 16 may be comprised of two or more compressor stages including a compressor train with a single drive. In line 14, the gas is cooled to condense water in condensor 18, and water exits via line 20.

The effluent from compressor 16 is transported via conduit 22 to the ammonia synthesis loop. The conventional synthesis loop is depicted in that the synthesis feed passes through recycle compressor 24 and ammonia coalescer 26 from which product ammonia is withdrawn via line 28. Positioning coalescer 22 prior to the ammonia synthesis reaction zone 30 insures that any water which may be present in the reactor feed gas is reduced to provide less than about 10 ppmv total oxygen-containing compounds in the reactor feed gas prior to contacting the synthesis catalyst. The reactor feed gas is heated by indirect heat exchange with the reaction effluent in heat exchange 32. The reaction effluent from heat exchanger 32 is cooled to a temperature of about 0° to 100° C., and is recycled via line 34 to the recycle compressor 24.

A purge stream is withdrawn from line 34 via line 36. The volume of the purge stream is sufficient to maintain an acceptable level of inert components in the recycle stream and ammonia synthesis reaction zone. As depicted, the purge stream is removed prior to the condensation of the ammonia product from the recycle stream. Thus, the purge stream contains substantial quantities of ammonia. Alternatively, the purge stream could be withdrawn subsequent to the ammonia condensation and removal from the recycle stream. In either event, in accordance with the method of this invention, ammonia is removed from the purge stream to provide a stream less than about 0.5, preferably less than 0.1, volume percent ammonia. The ammonia is removed from the purge stream in ammonia removal apparatus 38.

Figure 4:
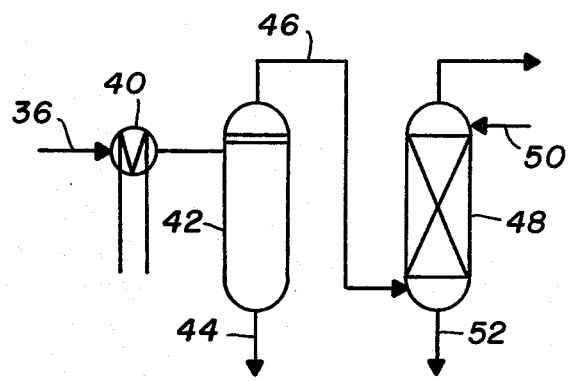
FIG. 4 is a simplified schematic flow diagram of a purge gas ammonia removal unit which may be employed in an ammonia synthesis plant in accordance with this invention.

FIG. 4 illustrates a suitable ammonia removal apparatus 38. In FIG. 4, the purge stream in line 36 enters cooler 40. Conveniently, cooler 40 employs the plant ammonia refrigerant which may be at a temperature of about −28° to −38° C. At these temperatures, a substantial portion of the ammonia combined in the purge stream is condensed. The cooled purge stream, e.g., at a temperature of about −15° to −38° C., is passed to purge separator 42 where the liquid ammonia is drawn off via line 44. The overhead from purge separator 42 usually contains greater than about 0.5 for instance, about 0.5 to 2 or 5, volume percent ammonia. In order to further reduce the ammonia concentration of the purge stream, the overhead from the purge separator is passed via line 46 to packed water scrubber 48. The water scrubber serves to remove sufficient ammonia from the purge stream to provide the desired low ammonia concentrations and also increases the temperature of the purge stream. The scrubber water enters water scrubber 48 via line 50 and exits containing ammonia in the form of ammonia hydroxide via line 52.

Figure 5:
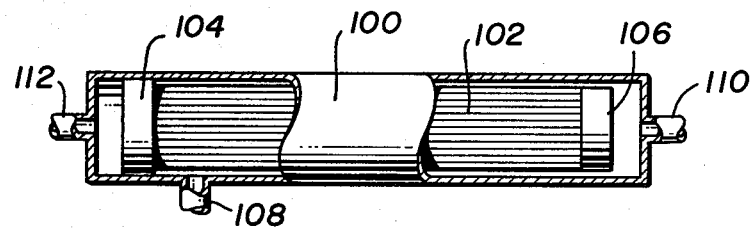
FIG. 5 is a schematic cross-section of a hollow fiber membrane-containing separator which may be employed in an ammonia synthesis plant in accordance with this invention.

Returning to FIG. 1, the overhead from the ammonia removal apparatus 38 is passed to permeator 54. A schematic cross-section of an axially, shell-side fed permeator is provided in FIG. 5. With reference to FIG. 5, within casing 100 is positioned a plurality of hollow fiber membranes which are arranged in bundle generally designated by the numeral 102. One end of the bundle is embedded in header 104 such that the bores of the hollow fibers are in communication through the header. The header is positioned in casing 100 such that essentially the only fluid communication through the header is through the bores of the hollow fibers. The opposite ends of the hollow fibers are sealed in end seal 106. The purge stream enters the casing through feed port 108, disperses within bundle 102 and passes to shell exit port 110 positioned at the opposite end of the casing. Hydrogen permeates to the bores of the hollow fibers and passes via the bores through header 104. The hydrogen-rich permeating gas exits casing 100 through permeate port 112. While FIG. 5 depicts a hollow fiber membrane-containing separator in which only one end of the hollow fibers is open, it is apparent that both ends of the hollow fibers can be open and permeate gas be obtained at both ends.

With reference to FIG. 1, the non-permeating gas contains hydrogen, methane, nitrogen, argon and, possibly, helium and exit separator 54 via line 56. The permeating gas, i.e., a hydrogen-rich stream, exits separator 54 via line 58. The pressure drop across the membrane is such that the permeating gas is at a pressure substantially the same as the pressure of the synthesis feed gas exiting compressor 12. Condensor 18 which is downstream from the part at which the permeating gas is combined with the synthesis feed gas, removes water to insure that no undue risks of catalyst poisoning occur. Alternatively, other suitable means for removal of water from the permeating gas, i.e., an adsorber, may be employed.

Figure 2:
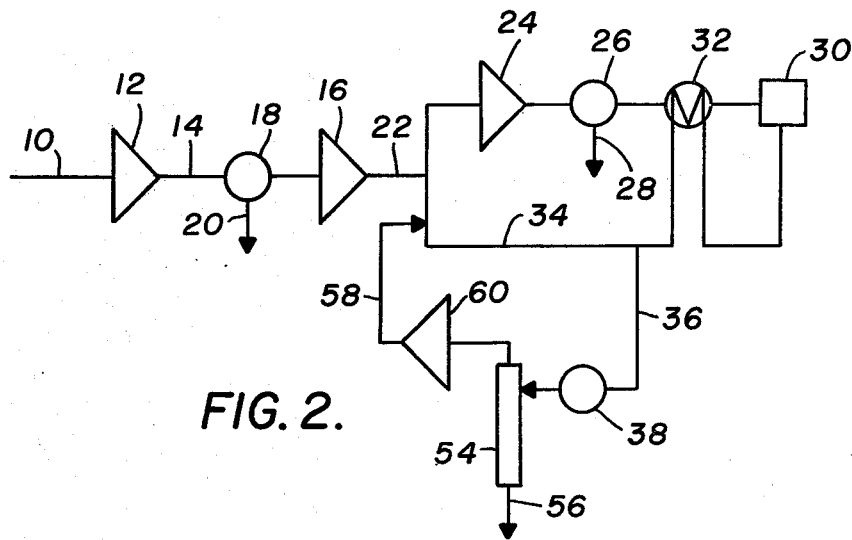
FIG. 2 is a simplified schematic flow diagram of an ammonia synthesis plant in accordance with this invention which plant is similar to the plant of FIG. 1 except that the permeating gas from the permeator is compressed and directly introduced into the ammonia synthesis loop.

The ammonia synthesis system of FIG. 2 is substantially the same as the system depicted in FIG. 1 except that the permeating gas from permeator 54 is compressed in compressor 60 and returned directly to the ammonia synthesis loop. This method may find application when retrofitting separation membrane hydrogen recovery systems into existing ammonia plants in order to utilize the process of this invention. For instance, if increased ammonia production is desired in an ammonia plant, but compressor 16 is at its maximum capacity, this bottleneck can be obviated by utilizing a compressor to increase the pressure of the permeating gas such that it can be introduced directly into the synthesis loop to provide additional hydrogen for conversion to ammonia without increasing the load through compressor 16. Also, the difference between the pressure on the feed side of the permeator and the feed side of compressor 16, in some ammonia plants, may be too great to be withstood by a membrane which may be employed. Accordingly, a lesser pressure drop can be utilized across the separation membrane while maintaining the feed side of the permeator at substantially the ammonia synthesis pressure. Consequently less compression is required to elevate the pressure of the permeating gas to the ammonia synthesis pressure.

Figure 3:
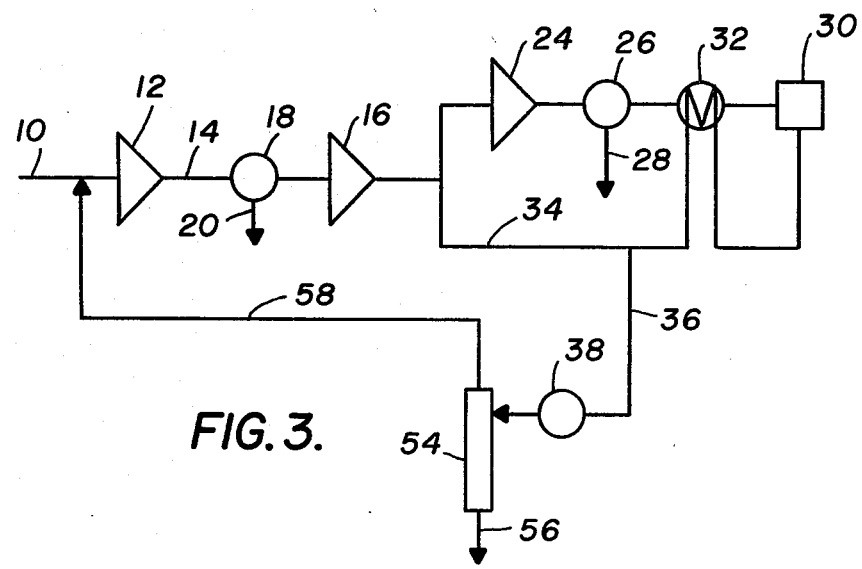
FIG. 3 is a simplified schematic flow diagram of an ammonia synthesis plant in accordance with this invention which plant is similar to the plant of FIG. 1 except that the permeating gas from the permeator is introduced into the synthesis feed gas prior to the compressors.

The ammonia synthesis system of FIG. 3 is substantially the same as the system depicted in FIG. 1 except that the permeating gas from permeator 54 is introduced into the synthesis feed gas passing to compressor 12. This method is desirable when a large hydrogen partial pressure differential is sought across the membrane. These large hydrogen partial pressure differentials increase the hydrogen flux through a given separation membrane and may find application in systems in which the recovery of hydrogen is more valuable than the increases in compression costs through compressor 12.

The following example is provided in illustration of a process in accordance with this invention. All parts and percentages are by volume unless otherwise noted.

Ammonia is synthesized from nitrogen and hydrogen employing an ammonia synthesis plant similar to that depicted in FIG. 1. The hydrogen feedstock is obtained by primary reforming of natural gas and the synthesis feed gas is obtained by introducing air and the primary reformer effluent into a secondary reformer. The effluent from the secondary reformer is treated in a shift convertor, a carbon dioxide absorber and a methanator to provide approximately 65,000 kilograms per hour of a synthesis feed gas containing about 25.5 mole percent nitrogen, 73.3 mole percent hydrogen, 0.6 mole percent methane, 0.4 mole percent argon, and 0.2 mole percent water. The synthesis feed gas is obtained at about 28 atmospheres absolute and 50° C. The feed gas is compressed to about 70 atmospheres absolute, cooled to about 8° C. to condense water. The dried feed gas is further compressed to about 133 atmospheres absolute and is introduced into the ammonia synthesis loop. The gas in the synthesis loop is compressed 6 or 7 atmospheres and is treated in an ammonia coalescer which removes about 44,500 kilograms of ammonia per hour. The gases are heated to about 105° to 110° C. Approximately 300,000 kilograms per hour of gas comprising about 67 mole percent hydrogen, 22 mole percent nitrogen, 6.5 mole percent methane, 3.3 mole percent argon, and 1.2 mole percent ammonia are introduced into a Kellogg-type ammonia synthesis convertor utilizing a promoted iron ammonia synthesis catalyst. An effluent at a temperature at about 280° C. is obtained from the synthesis convertor and contains about 11.5 percent ammonia. The effluent is cooled to about 43° C. A purge stream of about 2.1 percent of the gases in the synthesis loop is removed, and the remaining gases are returned to the synthesis loop compressor.

The purge stream is treated in an ammonia removal unit of the type depicted in FIG. 4. The purge stream is chilled to about −23° C. and about 820 kilograms per hour of liquid ammonia are condensed and removed from the purge stream. The purge stream is then scrubbed with water at about 25° C. used at a rate of about 2000 kilograms per hour. The resulting purge stream contains less than about 100 ppmv ammonia and is at a pressure of about 136 atmospheres absolute.

The purge stream is heated to about 30° C. and then passed to 35 hollow fiber membrane-containing permeators arranged in parallel. Each permeator is similar to that depicted in FIG. 5 and contains about 93 square meters of effective surface area. The membranes are comprised of anisotropic polysulfone substantially prepared in accordance with the method disclosed in Example 64 of the Henis, et al, United States patent application except that the spinning solution contains about 30 weight percent solids; the spinning jet dimensions are about 458 microns outside diameter, 127 microns inside diameter, and 76 microns diameter injection bore; the injection fluid is a mixture of 60 volume percent dimethylacetamide in water. The last godet bath is at a temperature of about 50° C.; and the fibers are washed for 24 hours with no subsequent storage in water. Appropriate polymer solution and injection fluid rates are employed such that the dimension of the hollow fibers are about 450 microns outside diameter and about 120 microns inside diameter. The permeator exhibits a separation factor of hydrogen over methane of about 30 and a permeability of about $50 \times 10^{-6}$ cubic centimeters of hydrogen (STP) per square centimeter of surface area per second per centimeter of mercury pressure drop. A pressure drop of about 65 atmospheres is maintained across the membrane, and approximately 2700 kilograms per hour of permeating gas is obtained from the bore side of the permeator. The permeating gas comprises 88.7 volume percent hydrogen, 7.2 volume percent nitrogen, 2.7 volume percent methane, 1.2 volume percent argon, and 0.2 volume percent water. The non-permeating gas from the separator is at a pressure of about 136 atmospheres absolute and contains about 40.3 volume percent hydrogen, 38.4 volume percent nitrogen, 14.1 volume percent methane, and 7.3 volume percent argon. The permeating gas is introduced into the feed gas exiting the first compressor prior to the water condensation.

It is claimed:
1. A process for synthesizing ammonia from hydrogen and nitrogen comprising:
   a. introducing to and reacting in an ammonia synthesis reaction zone a nitrogen and hydrogen-containing reactor feed gas at a superatmospheric synthesis pressure to produce ammonia;
   b. withdrawing an ammonia-containing reaction effluent from said ammonia synthesis reaction zone and recycling said reaction effluent to said ammonia synthesis reaction zone in an ammonia synthesis loop;
   c. introducing a synthesis feed gas into said ammonia synthesis loop, said synthesis feed gas being at substantially said superatmospheric synthesis pressure and comprising nitrogen, hydrogen, and at least one of methane and argon;
   d. removing ammonia from the reaction effluent in said ammonia synthesis loop;
   e. removing a purge stream from said ammonia synthesis loop in an amount sufficient to maintain the volume percent of inert contaminants in the reactor feed gas less than about 25 volume percent, said purge stream containing ammonia and being at substantially said superatmospheric synthesis pressure;
   f. removing ammonia from said purge stream comprising contacting said purge stream with an absorbent comprising water to provide a purge stream containing less than about 0.5 volume percent ammonia and water vapor;
   g. contacting said purge stream having an ammonia concentration less than about 0.5 volume percent with a separation membrane, said purge stream contacted with the separation membrane being at a superatmospheric pressure to provide a driving force for hydrogen permeation through the separation membrane, said separation membrane having a feed side and a permeate exit side at a lower total pressure and exhibiting selective permeation of hydrogen as compared to the permeation of each of methane and argon and exhibiting permeability of ammonia;
   h. permeating through and recovering from the permeate exit side of said separation membrane a permeating gas comprising water and at least about 20 percent of the hydrogen in the purge stream;
   i. removing from the feed side of said separation membrane a non-permeating gas;
   j. maintaining said permeating gas at a pressure of substantially at least said total pressure at said permeate exit side of the separation membrane; and
   k. combining said permeating gas with a gas passing to said ammonia synthesis reaction zone.

2. The process of claim 1 wherein the purge stream has an ammonia concentration of less than about 0.1 volume percent when contacted with the separation membrane.

3. The process of claim 1 wherein the permeating gas is dried prior to being introduced into said ammonia synthesis reaction zone.

4. The process of claim 2 wherein the permeating gas is combined with the synthesis feed gas prior to introducing the synthesis feed gas into the ammonia synthesis loop.

5. The process of claim 4 wherein the permeating gas is combined with the synthesis feed gas at a point where the permeating gas is at a slightly higher pressure than the synthesis feed gas.

6. The process of claim 5 wherein the synthesis feed gas is compressed in at least two stages to said superatmospheric synthesis pressure, and said permeating gas is introduced into said synthesis feed gas between two of the compression stages.

7. The process of claim 2 wherein the permeating gas is compressed to substantially said superatmospheric synthesis pressure and directly introduced into said ammonia synthesis loop.

8. The process of claim 5, 6 or 7 wherein the pressure drop across the separation membrane is at least about 20 atmospheres.

9. The process of claim 2, 4 or 7 wherein the purge stream is removed from said ammonia synthesis loop upstream of the removal of ammonia from the ammonia-containing gas.

10. A process for synthesizing ammonia from hydrogen and nitrogen comprising:
   a. introducing to and reacting in an ammonia synthesis reaction zone containing an ammonia synthesis catalyst a nitrogen and hydrogen-containing reactor feed gas said reactor gas also containing inert contaminants comprising at least one of methane and argon at a superatmospheric synthesis pressure of about 100 to 350 atmospheres absolute to produce ammonia, said reactor feed gas having a mole ratio of hydrogen to nitrogen of about 2.9:1 to 3.3:1;

b. withdrawing an ammonia-containing reaction effluent from said ammonia synthesis reaction zone and recycling said reaction effluent to said ammonia synthesis reaction zone in an ammonia synthesis loop, said reaction effluent comprising hydrogen, nitrogen, ammonia and at least one of methane and argon wherein the reaction effluent comprises about 10 to 25 volume percent ammonia;

c. removing a purge stream from said ammonia synthesis loop in an amount sufficient to maintain the volume percent of inert contaminants in the reactor feed gas less than about 25 volume percent;

d. removing ammonia from said purge stream to provide a purge stream containing less than about 0.1 volume percent ammonia, said removal being effected by cooling said purge gas at substantially said superatmospheric synthesis pressure to coalesce ammonia, separating the coalesced ammonia from the purge stream and then scrubbing the purge stream with water;

e. contacting said purge stream having ammonia removed with a separation membrane, said purge stream when contacted with the separation membrane being at a pressure of at least substantially said superatmospheric pressure, said separation membrane having a feed side and a permeate exit side and exhibiting selective permeation of hydrogen as compared to the permeation of each of methane and argon and exhibiting permeability of ammonia;

f. providing said permeate exit side of said separation membrane at a total pressure at least about 50 atmospheres less than the total pressure at said feed side of the membrane;

g. permeating through and recovering from the permeate exit side of said separation membrane a permeating gas comprising water vapor and at least about 20 percent of the hydrogen in the purge stream;

h. removing from the feed side of said separation membrane a non-permeating gas which is at substantially the same pressure of the purge stream contacting the feed side of the separation membrane;

i. maintaining said permeating gas at a pressure of substantially at least said total pressure at said premeate exit side of the separation membrane;

j. combining said permeating gas with a gas passing to said ammonia synthesis reaction zone, said permeating gas being dried prior to entering the ammonia synthesis reaction zone;

k. introducing a synthesis feed gas into said ammonia synthesis loop after said purge stream has been withdrawn from the ammonia synthesis loop, said synthesis feed gas being at substantially said superatmospheric synthesis pressure and comprising nitrogen, hydrogen, and at least one of methane and argon, wherein the mole ratio of hydrogen to nitrogen is less than the mole ratio of hydrogen to nitrogen in the reactor feed gas and is about 2.7:1 to 3.2:1; and l. removing ammonia from the ammonia synthesis loop after introducing the synthesis feed gas into the ammonia synthesis loop.

11. The process of claim 10 wherein the separation membrane exhibits a separation factor for hydrogen over methane is at least about 10.

12. The process of claim 10 or 11 wherein the permeating gas comprises about 60 to essentially 100 volume percent hydrogen.

13. The process of claim 10 wherein the permeating gas comprises about 40 to 80 percent of the hydrogen in the purge gas.

14. The process of claim 10 wherein the reactor feed gas introduced into the ammonia synthesis reaction zone comprises about 0.5 to 5 volume percent ammonia, about 2 to 15 volume percent methane, and about 2 to 10 volume percent argon.

15. The process of claim 10 wherein the permeating gas is combined with the synthesis feed gas prior to introducing the synthesis feed gas into the ammonia synthesis loop.

16. The process of claim 15 wherein the permeating gas is at a slightly higher pressure than the synthesis feed gas when combined.

17. The process of claim 16 wherein the synthesis feed gas is compressed in at least two stages to said superatmospheric synthesis pressure, and said permeating gas is combined with said synthesis feed gas between two of the compression stages.

18. The process of claim 17 wherein said synthesis feed gas contains water, water is removed from the synthesis feed gas prior to its introduction into the ammonia synthesis loop, and the permeating gas is combined with the synthesis feed gas prior to said water removal.

19. The process of claim 10 wherein the permeating gas is compressed to substantially said superatmospheric synthesis pressure and directly introduced into said ammonia synthesis loop.

20. A process for synthesizing ammonia from hydrogen and nitrogen comprising:

a. introducing to and reacting in an ammonia synthesis reaction zone a nitrogen and hydrogen-containing reactor feed gas at a superatmospheric synthesis pressure to produce ammonia;

b. withdrawing an ammonia-containing reaction effluent from said ammonia synthesis reaction zone and recycling said reaction effluent to said ammonia synthesis reaction zone in an ammonia synthesis loop;

c. introducing a synthesis feed gas into said ammonia synthesis loop, said synthesis feed gas being at substantially said superatmospheric synthesis pressure and comprising nitrogen, hydrogen, and at least one of methane and argon;

d. removing ammonia from the reaction effluent in said ammonia synthesis loop;

e. removing a purge stream from said ammonia synthesis loop in an amount sufficient to maintain the volume percent of inert contaminants in the reactor feed gas less than about 25 volume percent, said purge stream containing ammonia and being at substantially said superatmospheric synthesis pressure;

f. removing ammonia from said purge stream to provide a purge stream containing less than about 0.1 volume percent ammonia;

g. contacting said purge stream having an ammonia concentration less than about 0.1 volume percent with a separation membrane, said purge stream when contacted with the separation membrane being at a superatmospheric pressure to provide a driving force for hydrogen permeation through the separation membrane, said separation membrane having a feed side and a permeate exit side at a lower total pressure and exhibiting selective permeation of hydrogen as compared to the permeation of each of methane and argon and exhibiting permeability of ammonia;

h. permeating through and recovering from the permeate exit side of said separation membrane a permeating gas comprising at least about 20 percent of the hydrogen in the purge stream;

i. removing from the feed side of said separation membrane a non-permeating gas;

j. maintaining said permeating gas at a pressure of substantially at least said total pressure at said permeate exit side of the separation membrane; and k. combining said permeating gas with a gas passing to said ammonia synthesis reaction zone.

21. The process of claim 20 wherein the permeating gas is combined with the synthesis feed gas prior to introducing the synthesis feed gas into the ammonia synthesis loop.

22. The process of claim 21 wherein the permeating gas is combined with the synthesis feed gas at a point where the permeating gas is at a slightly higher pressure than the synthesis feed gas.

23. The process of claim 22 wherein the synthesis feed gas is compressed in at least two stages to said superatmospheric synthesis pressure, and said permeating gas is introduced into said synthesis feed gas between two of the compression stages.

24. The process of claim 20 wherein the permeating gas is compressed to substantially said superatmospheric synthesis pressure and directly introduced into said ammonia synthesis loop.

25. The process of claim 20, 21 or 24 wherein the pressure drop across the separation membrane is at least about 20 atmospheres.

26. The process of claim 20, 21 or 24 wherein the purge stream is removed from said ammonia synthesis loop upstream of the removal of ammonia from the ammonia-containing gas.

* * * * *